United States Patent
Kume

(10) Patent No.: US 8,045,027 B2
(45) Date of Patent: Oct. 25, 2011

(54) SOLID-STATE IMAGING APPARATUS

(75) Inventor: Atsuko Kume, Sagamihara (JP)

(73) Assignee: Olympus Corporation, Tokyo (JP)

( * ) Notice: Subject to any disclaimer, the term of this patent is extended or adjusted under 35 U.S.C. 154(b) by 435 days.

(21) Appl. No.: 12/408,169

(22) Filed: Mar. 20, 2009

(65) Prior Publication Data

US 2009/0244337 A1    Oct. 1, 2009

(30) Foreign Application Priority Data

Mar. 26, 2008   (JP) ................................ 2008-079519

(51) Int. Cl.
  *H04N 5/335*   (2011.01)
  *H01L 27/00*   (2006.01)
(52) U.S. Cl. .................................... 348/294; 250/208.1
(58) Field of Classification Search ............... 250/208.1; 348/241, 294, 300, 301, 302, 308
  See application file for complete search history.

(56) References Cited

U.S. PATENT DOCUMENTS 7,961,238 B2 *   6/2011   Nitta et al. .................... 348/302

FOREIGN PATENT DOCUMENTS

JP           2006-287879 A    10/2006

\* cited by examiner

*Primary Examiner* — David N Spector
(74) *Attorney, Agent, or Firm* — Westerman, Hattori, Daniels & Adrian, LLP

(57) ABSTRACT

A solid-state imaging apparatus including: a pixel section where a plurality of pixels each containing a photoelectric conversion device are formed into an array; a retaining circuit for retaining one or the other of a reset signal and a light signal of the signals from the pixel; and an AD converter, the AD converter includes: a delay circuit having two input signal terminals to one of the input signal terminals of which the signal retained at the retaining circuit is inputted and to the other one of the input signal terminal of which the other signal not retained at the retaining circuit is inputted, said delay circuit having delay devices connected into a multiple of stages for giving to a running pulse a delay amount corresponding to the extent of a difference between the signals inputted to said one and the other input signal terminals; and an encoder for sampling and encoding a running position of the pulse at every predetermined timing to generate a digital value corresponding to the difference between the input signals.

5 Claims, 12 Drawing Sheets

SOLID-STATE IMAGING APPARATUS

This application claims benefit of Japanese Patent Application No. 2008-79519 filed in Japan on Mar. 26, 2008, the contents of which are incorporated by this reference.

BACKGROUND OF THE INVENTION

The present invention relates to solid-state imaging apparatus for example for use in a digital camera, digital video camera, endoscope, etc.

In recent years, size reduction and power saving of the digital camera/digital video camera or of the endoscope are advanced and make it increasingly inevitable to correspondingly reduce size and power consumption of the solid-state imaging apparatus to be used in these. To achieve such a reduction in size and power consumption, solid-state imaging apparatus having an AD conversion circuit formed of digital circuits have been proposed for example in Japanese Patent Application Laid-Open 2006-287879.

FIG. 1 is a block diagram schematically showing construction of a prior-art solid-state imaging apparatus. In this solid-state imaging apparatus, a pixel section is two-dimensionally arranged or in the illustrated example formed into a 4-row by 5-column array of blocks (sub-array) B1, B2, . . . each containing a pixel block 201 where pixel cells having photoelectric conversion device are two-dimensionally arranged into an array and an AD conversion section 202 for the AD-conversion of the signals from the pixel block 201. FIG. 2 is a block diagram showing an example of the circuit construction of the AD conversion section 202 in FIG. 1. The AD conversion section 202 includes a delay circuit 211 where delay devices for giving a delay amount corresponding to an input voltage to a running pulse are connected into a multiple of stages, and an encoder 212 where running position of such pulse is sampled and encoded at every predetermined timing to generate a digital value corresponding to the input voltage. It is to generate a digital value corresponding to the input voltage according to an input signal.

SUMMARY OF THE INVENTION

In a first aspect of the invention, there is provided a solid-state imaging apparatus including: a pixel section where a plurality of pixels each containing a photoelectric conversion device are formed into an array; a retaining circuit for retaining one or the other of a reset signal and a light signal of the signals from the pixel; and an AD converter. The AD converter includes: a delay circuit having two input signal terminals to one of the input signal terminals of which the signal retained at the retaining circuit is inputted and to the other one of the input signal terminal of which the other signal not retained at the retaining circuit is inputted, said delay circuit having delay devices connected into a multiple of stages for giving to a running pulse a delay amount corresponding to the extent of a difference between the signals inputted to said one and the other input signal terminals; and an encoder for sampling and encoding a running position of the pulse at every predetermined timing to generate a digital value corresponding to the difference between the input signals.

In a second aspect of the invention, the solid-state imaging apparatus according to the first aspect taking the retaining circuit as a first retaining circuit and further including a second retaining circuit for retaining the other signal not retained at the first retaining circuit, the signal retained at the second retaining circuit being inputted to said the other input signal terminal of the AD converter.

In a third aspect of the invention, the solid-state imaging apparatus according to the first or second aspect further includes a circuit for superimposing an offset value so that the signals respectively inputted to the two input signal terminals of the AD converter are not the same with each other.

In a fourth aspect of the invention, there is provided a solid-state imaging apparatus including: a pixel section where a plurality of pixels each having a photoelectric conversion device are formed into an array; a differential processing circuit for computing a difference between a reset signal and a light signal from the pixel; and an AD converter. The AD converter includes: a delay circuit having two input signal terminals to one of the input signal terminals of which an output from the differential processing circuit is inputted and to the other one of the input signal terminals of which a reference signal is inputted, said delay circuit having delay devices connected in a multiple of stages for giving to a running pulse a delay amount corresponding to the extent of a difference between the signals inputted to said one and the other input signal terminals; and an encoder for sampling and encoding a running position of the pulse at every predetermined timing to generate a digital value corresponding to the difference between the input signals.

In a fifth aspect of the invention, the solid-state imaging apparatus according to the fourth aspect further includes an amplification circuit for applying a predetermined gain on the output from the differential processing circuit and then outputting from the amplification circuit to the one input signal terminal of the AD converter.

DESCRIPTION OF THE PREFERRED EMBODIMENTS

Some embodiments of the solid-state imaging apparatus according to the invention will be described below with reference to the drawings.

Embodiment 1

Figure 1:
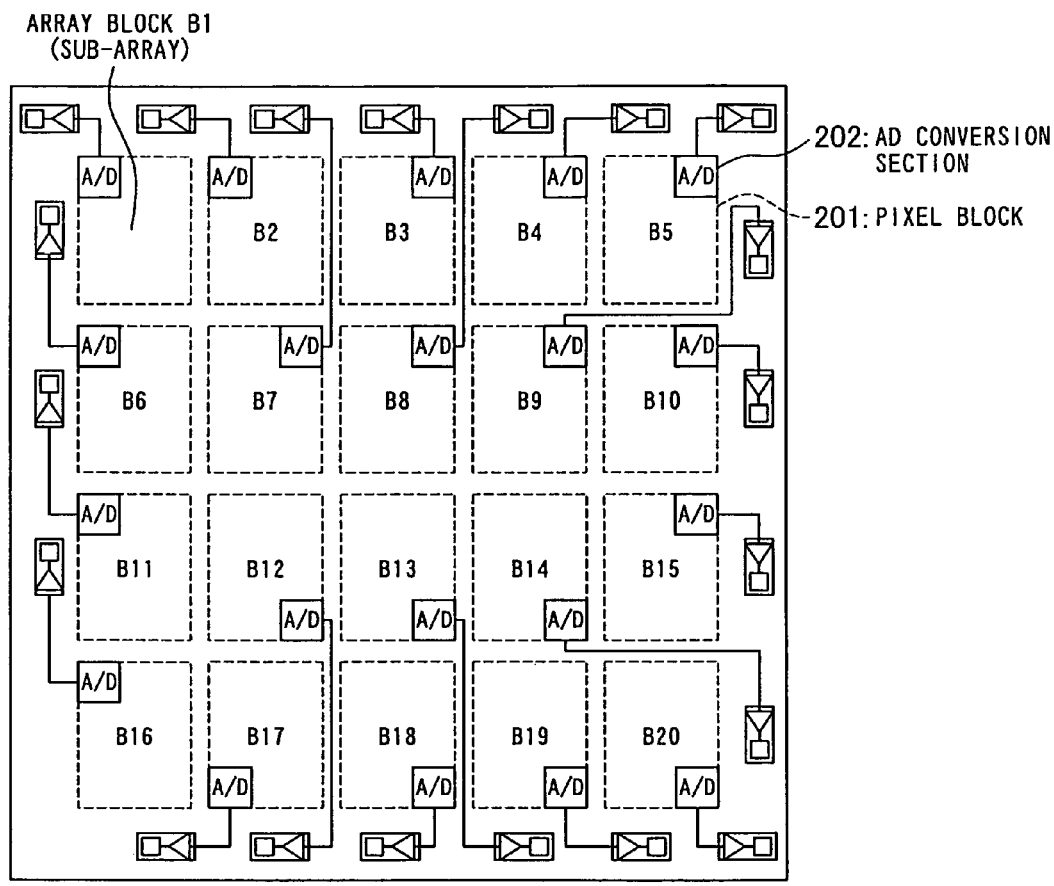
FIG. 1 is a block diagram schematically showing an example of construction of prior-art solid-state imaging apparatus.
Figure 2:
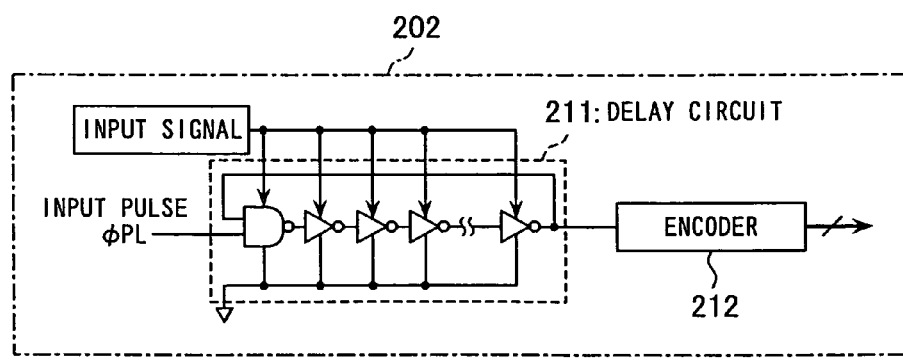
FIG. 2 is a block diagram showing construction of an AD conversion section in the solid-state imaging apparatus shown in FIG. 1.
Figure 3:
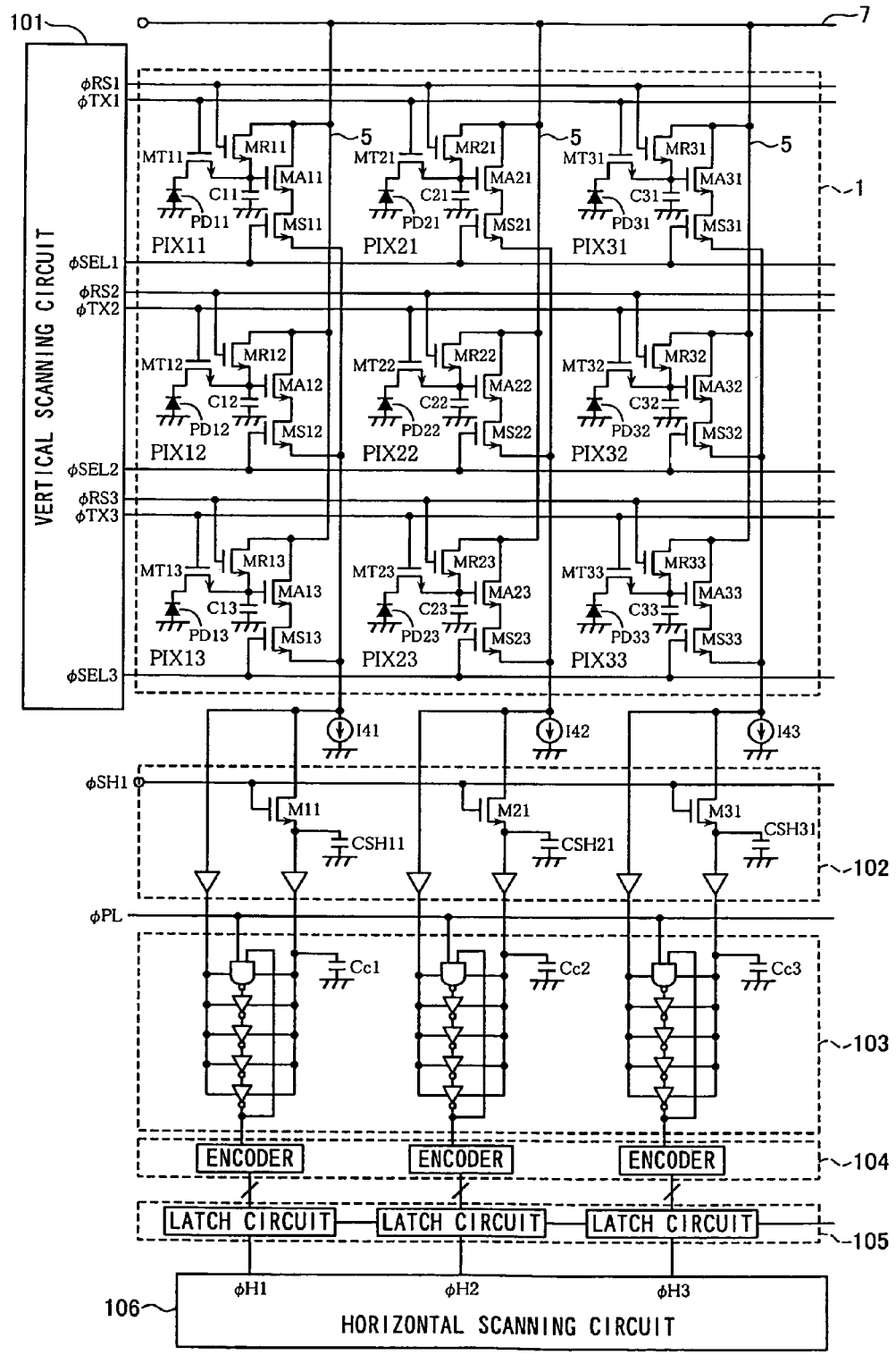
FIG. 3 is a circuit diagram showing construction of a first embodiment of the solid-state imaging apparatus according to the invention.
Figure 4:
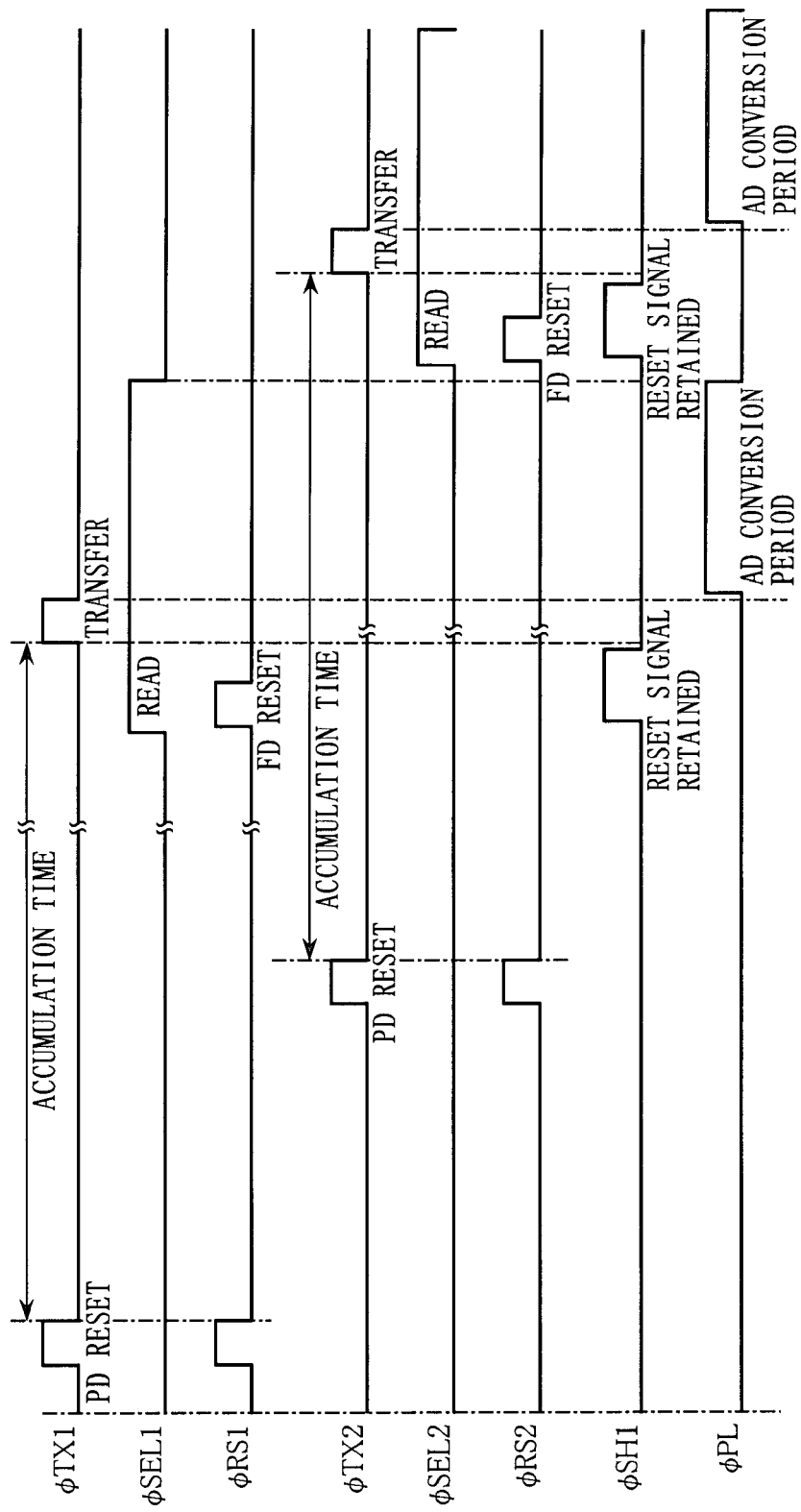
FIG. 4 is a timing chart for explaining operation of the first embodiment shown in FIG. 3.

A first embodiment of the solid-state imaging apparatus according to the invention will now be described. FIG. 3 is a circuit diagram showing construction of the solid-state imaging apparatus according to the first embodiment; and FIG. 4 is a timing chart for explaining its operation. The construction of the solid-state imaging apparatus according to the first embodiment will first be described with using FIG. 3. Referring to FIG. 3, PIX11 is a pixel on the first column of the first row in a pixel section. Provided at the interior of the PIX11 are a photoelectric conversion section PD11, a memory for accumulating signal generated at the photoelectric conversion section PD11 (hereinafter abbreviated as FD section) C11, a transfer switch MT11 for controlling a transfer from the photoelectric conversion section PD11 to the FD section C11, a reset switch MR11 for resetting the FD section C11, an amplification section MA11 for amplifying a signal of the FD section C11, and a select switch MS11 for selecting the pixel PIX11, which are connected as shown to form a pixel. A plurality of pixels each having such construction are two-dimensionally arranged (3 rows by 3 columns in the illustrated example) to constitute a pixel section 1. It should be noted that constituent components of each of the other pixels PIX21, PIX31, PIX12, PIX22, PIX32, PIX13, PIX23, PIX33 of the pixel section 1 are denoted by numerals corresponding to each pixel of the respective row and column.

The transfer switches MT11, MT21, MT31 of the pixels PIX11, PIX21, PIX31 of the first row are controlled by a transfer control signal φTX1 outputted from a vertical scanning circuit 101; select switches MS11, MS21, MS31 are controlled by a select control signal φSEL1 also outputted from the vertical scanning circuit 101; and reset switches MR11, MR21, MR31 are controlled by a reset control signal φRS1 also outputted from the vertical scanning circuit 101.

Further, transfer switches MT12, MT22, MT32 of the pixels PIX12, PIX22, PIX32 of the second row are controlled by a transfer control signal φTX2 outputted from the vertical scanning circuit 101; select switches MS12, MS22, MS32 are controlled by a select control signal φSEL2 also outputted from the vertical scanning circuit 101; and reset switches MR12, MR22, MR32 are controlled by a reset control signal φRS2 also outputted from the vertical scanning circuit 101.

Similarly, transfer switches of the pixels PIX13, PIX23, PIX33 of the third row are controlled by a transfer control signal φTX3 outputted from the vertical scanning circuit 101; select switches MS13, MS23, MS33 are controlled by a select control signal φSEL3 also outputted from the vertical scanning circuit 101; and reset switches MR13, MR23, MR33 are controlled by a reset control signal φRS3 also outputted from the vertical scanning circuit 101.

It should be noted that one end of the reset switch MR11, . . . , MR33 and of the amplification section MA11, . . . , MA33 of each pixel is respectively connected to a pixel power supply line 7. Further, one end of the select switch MS11, . . . , MS33 of each pixel is connected respectively in common by the unit of column to a column-by-column vertical signal line 5 to one end of which a pixel current supply 141 to 143 is connected.

The signals of the pixels of each row selected by the select control signal φSEL1 to φSEL3 are written to a, retaining circuit 102 through the vertical signal line 5. The retaining circuit 102 includes sample-and-hold switches M11 to M31 that are controlled by a sample-and-hold control signal φSH1 and sample-and-hold capacitors CSH11 to CSH31.

The sample-and-hold capacitors CSH11 to CSH31 connected to input terminal through the sample-and-hold switches M11 to M31 are connected to a first output terminal (connection through amplifier as in the illustrated example also possible), and the input terminal is directly connected also to a second output terminal. The signal stored at the retaining circuit 102 is inputted to a delay circuit 103, and, with respect to a running pulse, the delay, circuit 103 outputs to an encoder 104 running position of the pulse within the delay circuit corresponding to difference between two input signals. At the encoder 104, the running position of the pulse is sampled at predetermined timings and such sampling value is encoded to generate a digital signal. The digital signal converted at the encoder 104 is retained at the latch circuit 105. An AD conversion section is formed with the delay circuit 103 and the encoder 104.

It should be noted that the delay circuit 103 is formed of delay units for outputting pulse signal φPL with delaying it correspondingly to signal amount inputted from the retaining circuit 102, and a delay unit is constructed by connecting such gate circuits as inverters into a multiple of stages (the first stage in the illustrated example constructed by a NAND and the four stages following the first constructed by inverter circuits). The digital signals retained at the latch circuit 105 are read out by means of column select signals φH1 to φH3 outputted from a horizontal scanning circuit 106.

An operation of thus constructed solid-state imaging apparatus will now be described by way of a timing chart shown in FIG. 4. The case of reading signals of the pixels PIX11 to PIX13 of the first row will first be described. At first, the transfer control signal φTX1 and the reset control signal φRS1 are driven to high level to reset the photoelectric conversion section PD11, PD21, PD31, and the FD section C11, C21, C31 of the pixels of the first row. The transfer control signal φTX1 and the reset control signal φRS1 are then brought to low level to end the resetting, thereby starting an accumulation of light signal electric charge.

Subsequently, after passage of a predetermined time, the pixel signals are read out to the retaining circuit 102. Previously to the reading of pixel signal, the reset control signal φRS1 is at first driven to high level to reset the FD section C11, C21, C31, and the reset control signal φRS1 is then brought to low level to end the resetting of the FD section C11, C21, C31. The select control signal φSEL1 is then driven to high level to start outputting of the reset signal of the pixels PIX11, PIX21, PIX31 of the first row.

Next, the sample-and-hold control signal φSH1 of the retaining circuit 102 is driven to high level to output reset signal of the pixels PIX11, PIX21, PIX31 of the first row to the sample-and-hold capacitors CSH11, CSH21, CSH31, and the sample-and-hold control signal φSH1 is brought to low level to retain the reset signal at the sample-and-hold capacitor CSH11, CSH21, CSH31.

Next, the transfer control signal φTX1 is driven to high level to end an accumulation of light signal electric charge of the pixels PIX11, PIX21, PIX31 of the first row, and such light signal electric charges are transferred to the FD section C11, FD section C21, and FD section C31. The light signal electric charges retained at the FD section C11, C21, C31 are thereby outputted as light signal to the second input terminal of the delay circuit 103 through the amplification section MA11, MA21, MS31, select switch MS11, MS21, MS31, the vertical signal line 5, and the directly connected second output terminal of the retaining circuit 102. At this time, a voltage corresponding to reset signal of each pixel retained at the sample-and-hold capacitor CSH11, CSH21, CSH31 is applied through the first output terminal of the retaining circuit 102 on the first input terminal of the delay circuit 103 on which a power supply voltage is normally supplied, and on the other hand, the light signal of each pixel is applied as described on the second input terminal of the delay circuit 103 which is normally connected to GND.

Next at the delay circuit 103, the pulse signal φPL is driven to high level so that the running position of the pulse within the delay circuit where delay devices are connected into a multiple of stages for giving a delay amount corresponding to the extent of a difference between reset signal and light signal outputted from the pixel PIX11, PIX21, PIX31 of the first row is outputted to the encoder 104. At the encoder 104, the running position of the pulse is sampled at a predetermined timing so that such sampling value is encoded to effect a digital conversion. After passage of a predetermined time, the pulse signal φPL is brought to low level to end the digital conversion, and the latch circuit 105 retains the converted digital signal. Finally, a selection of the latch circuits 105 is effected by the column select signal φH1 to φH3 outputted from the horizontal scanning circuit 106 so that data on the latch circuit 105 are sequentially outputted. A similar operation is then sequentially effected also on the pixels of the second row and after.

With the solid-state imaging apparatus according to the first embodiment where the above described operation is effected with the above described circuit construction, a variance in characteristic of each pixel is removed so that an excellent image can be obtained. It should be noted that, at the delay circuit 103, signal stabilizing capacitance Cc1, Cc2, Cc3 can be added to between the first input terminal to which a voltage corresponding to reset signal is inputted and the reference voltage (GND in the illustrated example). The AD conversion accuracy can be thereby improved by suppressing a fluctuation in the input signal so that an excellent image can be obtained. Further, the above described signal stabilizing capacitance can be added to one or both of the two input terminals of the delay circuit 103 or be added to between the two input terminals.

Embodiment 2

Figure 5:
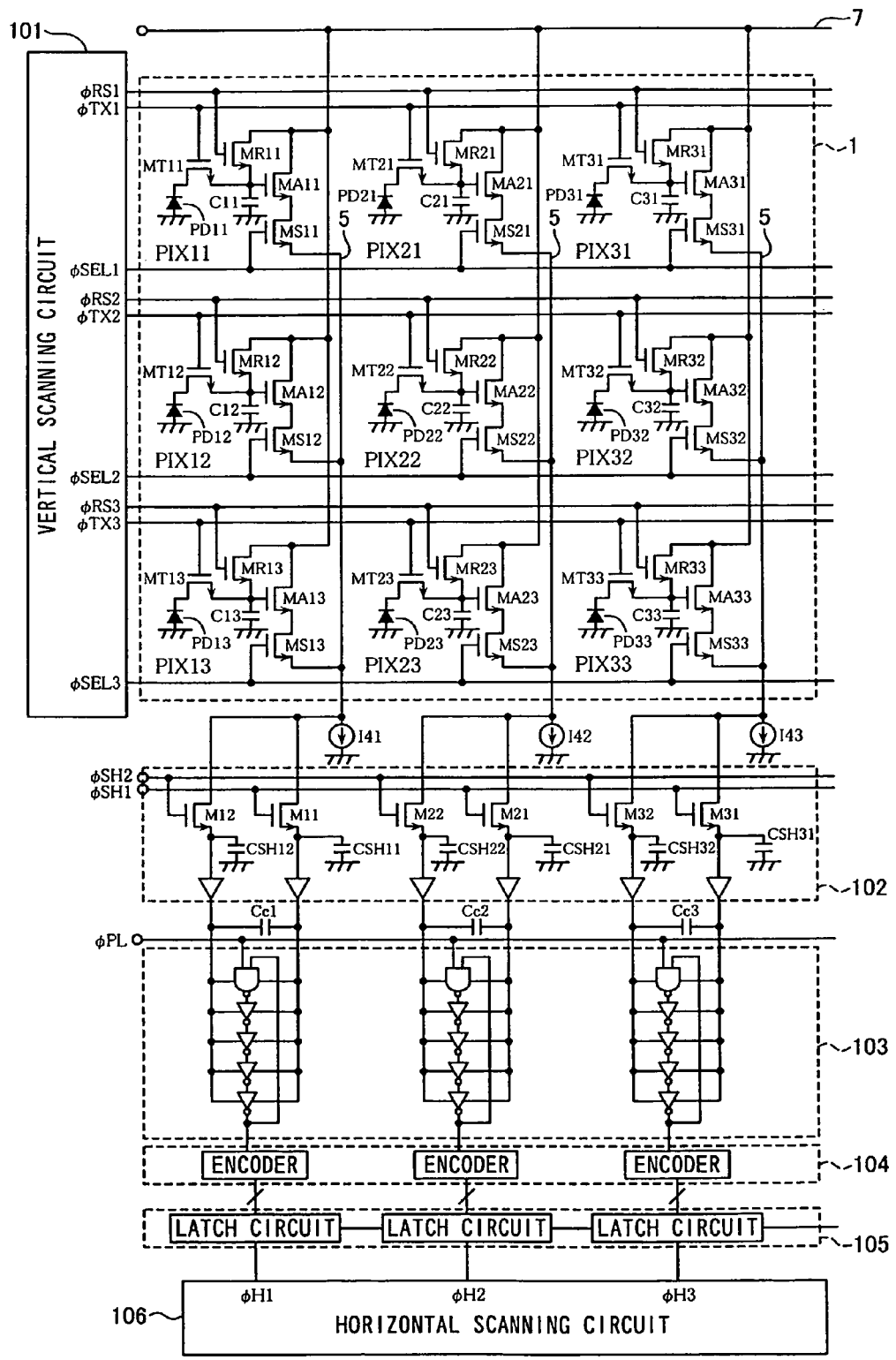
FIG. 5 is a circuit diagram showing construction of the slid-state imaging apparatus according to a second embodiment.

A second embodiment of the invention will now be described. FIG. 5 is a circuit diagram showing construction of the solid-state imaging apparatus according to the second embodiment. It is different from the first embodiment shown in FIG. 3 in the construction of the retaining circuit 102. In particular, the retaining circuit 102 includes: first sample-and-hold switches M11, M21, M31 controlled by a first sample-and-hold control signal φSH1; second sample-and-hold switches M12, M22, M32 controlled by a second sample-and-hold control signal φSH2; first sample-and-hold capacitors CSH11 to CSH31; and second sample-and-hold capacitors CSH12 to CSH32. The construction of the rest is identical to the first embodiment shown in FIG. 3 and will not be described.

Figure 6:
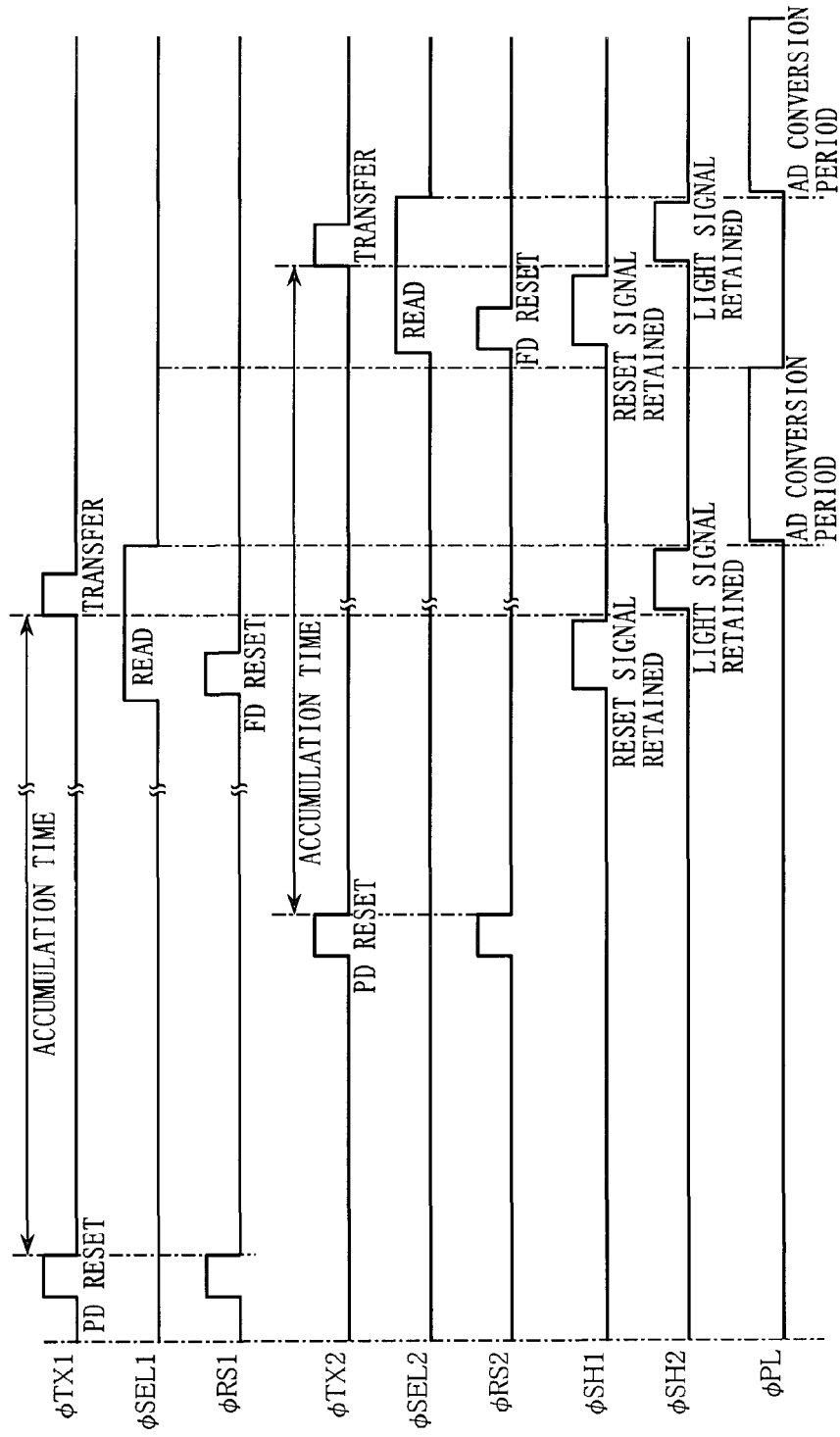
FIG. 6 is a timing chart for explaining operation of the second embodiment shown in FIG. 5.

An operation of thus constructed solid-state imaging apparatus will now be described by way of a timing chart shown in FIG. 6. The case of reading signals of the pixels of the first row will first be described. At first, the transfer control signal φTX1 and the reset control signal φRS1 are driven to high level to reset the photoelectric conversion section PD11, PD21, PD31, and the FD section C11, C21, C31 of the pixels PIX11, PIX21, PIX31 of the first row. The transfer control signal φTX1 and the reset control signal φRS1 are then brought to low level to end the resetting, thereby starting an accumulation of light signal electric charge.

Subsequently, after passage of a predetermined time, the signals of pixel are read out to the retaining circuit 102. Previously to the reading of pixel signal, the reset control signal φRS1 is at first driven to high level to reset the FD section C11, C21, C31, and the reset control signal φRS1 is then brought to low level to end the resetting of the FD section C11, C21, C31. The select control signal φSEL1 is then driven to high level to start outputting of the reset signal of the pixels PIX11, PIX21, PIX31 of the first row.

Next, the first sample-and-hold control signal φSH1 of the retaining circuit 102 is driven to high level to output reset signal of the pixels PIX11, PIX21, PIX31 of the first row to the first sample-and-hold capacitors CSH11, CSH21, CSH31. The first sample-and-hold control signal φSH1 is then brought to low level to retain the reset signal of each pixel at the first sample-and-hold capacitor CSH11, CSH21, CSH31.

Next, the transfer control signal φTX1 is driven to high level to end an accumulation of light signal electric charge and transfer the light signal electric charges to the FD section C11, C21, C31. After driving the second sample-and-hold signal φSH2 of the retaining circuit 102 to high level, it is brought to low level to retain the light signal of the pixel PIX11, PIX21, PIX31 of the first row at the second sample-and-hold capacitor CSH12, CSH22, CSH32. At this time, a voltage corresponding to the reset signal of each pixel retained at the first sample-and-hold capacitor CSH11, CSH21, CSH31 of the retaining circuit 102 is applied on the first input terminal of the delay circuit 103 on which a power supply voltage is normally supplied. On the other hand, a voltage corresponding to the light signal of each pixel retained at the second sample-and-hold capacitor CSH12, CSH22, CSH32 of the retaining circuit 102 is applied on the second input terminal of the delay circuit 103 which is normally connected to GND.

Next, the pulse signal PL of the delay circuit 103 is driven to high level, thereby outputting from the delay circuit 103 to the encoder 104 the running position of the pulse within the delay circuit where delay devices are connected in a multiple of stages for giving a delay amount corresponding to the extent of a difference between reset signal and light signal outputted from the pixel PIX11, PIX21, PIX31 of the first row. At the encoder 104, the running position of the pulse is sampled at a predetermined timing so that such sampling value is encoded to effect a digital conversion. After passage of a predetermined time, the pulse signal PL is brought to low level to end the digital conversion, and the latch circuit 105 retains the converted digital signal. Finally, a selection of the latch circuits 105 is effected by the column select signal φH1 to φH3 outputted from the horizontal scanning circuit 106 so that data on the latch circuit 105 are sequentially outputted. A similar operation is then sequentially effected also on the pixels of the second row and after.

With the solid-state imaging apparatus according to the second embodiment where the above described operation is effected with the above described circuit construction, a variance in characteristic of each pixel is removed so that an excellent image can be obtained. Further, since light signal is retained at the second sample-and-hold capacitor CSH12, CSH22, CSH32, AD conversion can be effected even after the outputting of light signal by the pixel is ended. Thus the performance of AD conversion can be further improved so as to obtain a more excellent image. It should be noted that signal stabilizing capacitance Cc1, Cc2, Cc3 can be added between the two input terminals of the delay circuit 103. It is thereby possible to improve the AD conversion accuracy by suppressing a fluctuation in the voltage difference of the two input signals, and therefore to obtain an excellent image. Further, it is also possible to add the signal stabilizing capacitance between the input signal terminal of the delay circuit 103 and the reference voltage, and further the signal stabilizing capacitance may be added to one or both of the two input terminals.

Embodiment 3

Figure 7:
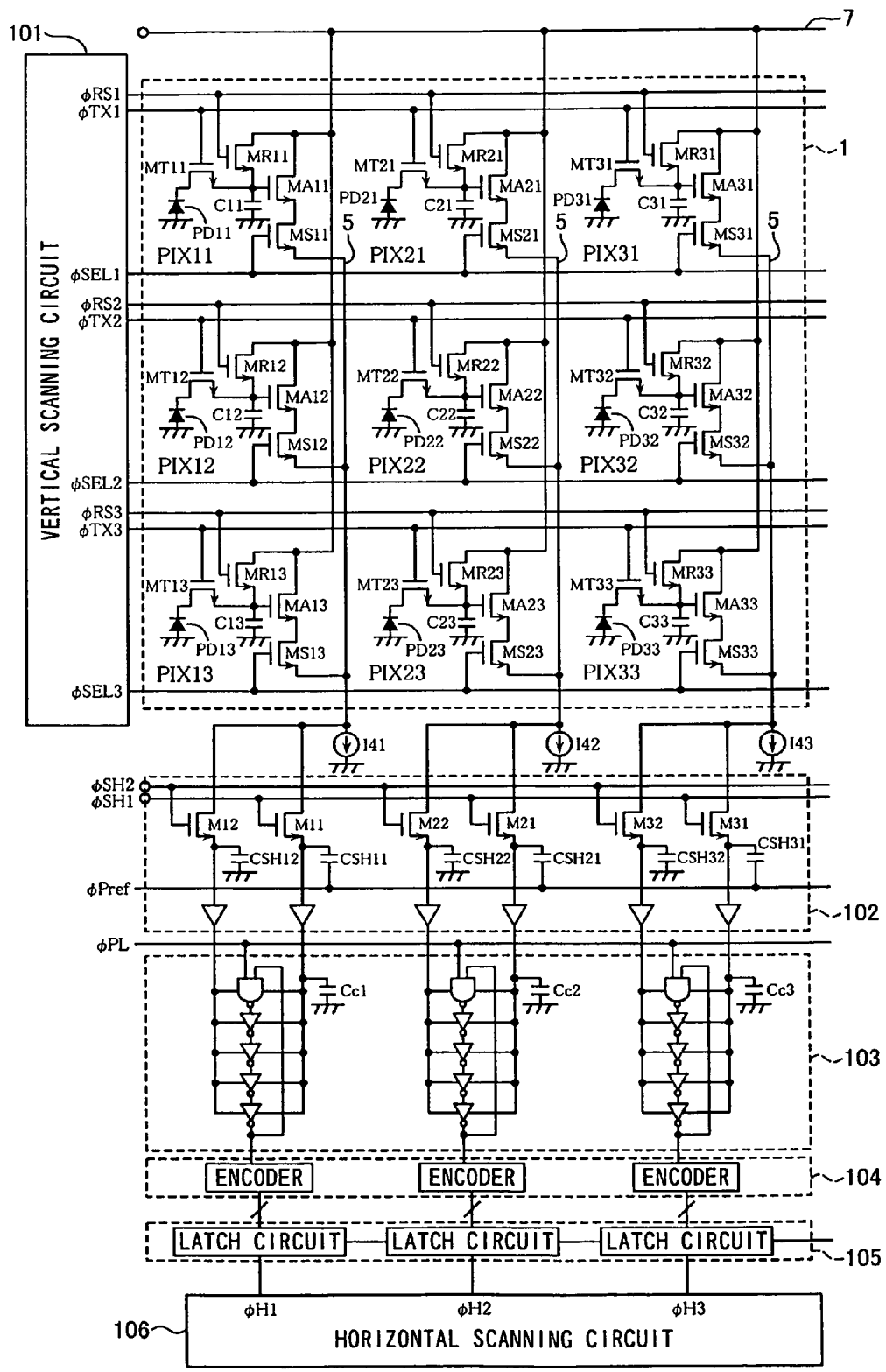
FIG. 7 is a circuit diagram showing construction of the solid-state imaging apparatus according to a third embodiment.

A third embodiment of the invention will now be described. FIG. 7 is a circuit diagram showing construction of the solid-state imaging apparatus according to the third embodiment. At the retaining circuit 102 of the third embodiment, as compared to the second embodiment, the terminal of the first sample-and-hold capacitor CSH11, CSH21, CSH31, which was previously connected to GND, is in this case connected to a control signal line on which a control signal φPref is applied. An output then can be provided to the delay circuit 103 with adding as offset voltage to the reset signal outputted from pixel a voltage corresponding to a difference between two reference potentials (GND and Vref in the illustrated example) outputted by the control signal φPref. The construction of the rest is similar to the first or second embodiment shown in FIG. 3 or 5 and will not be described.

Figure 8:
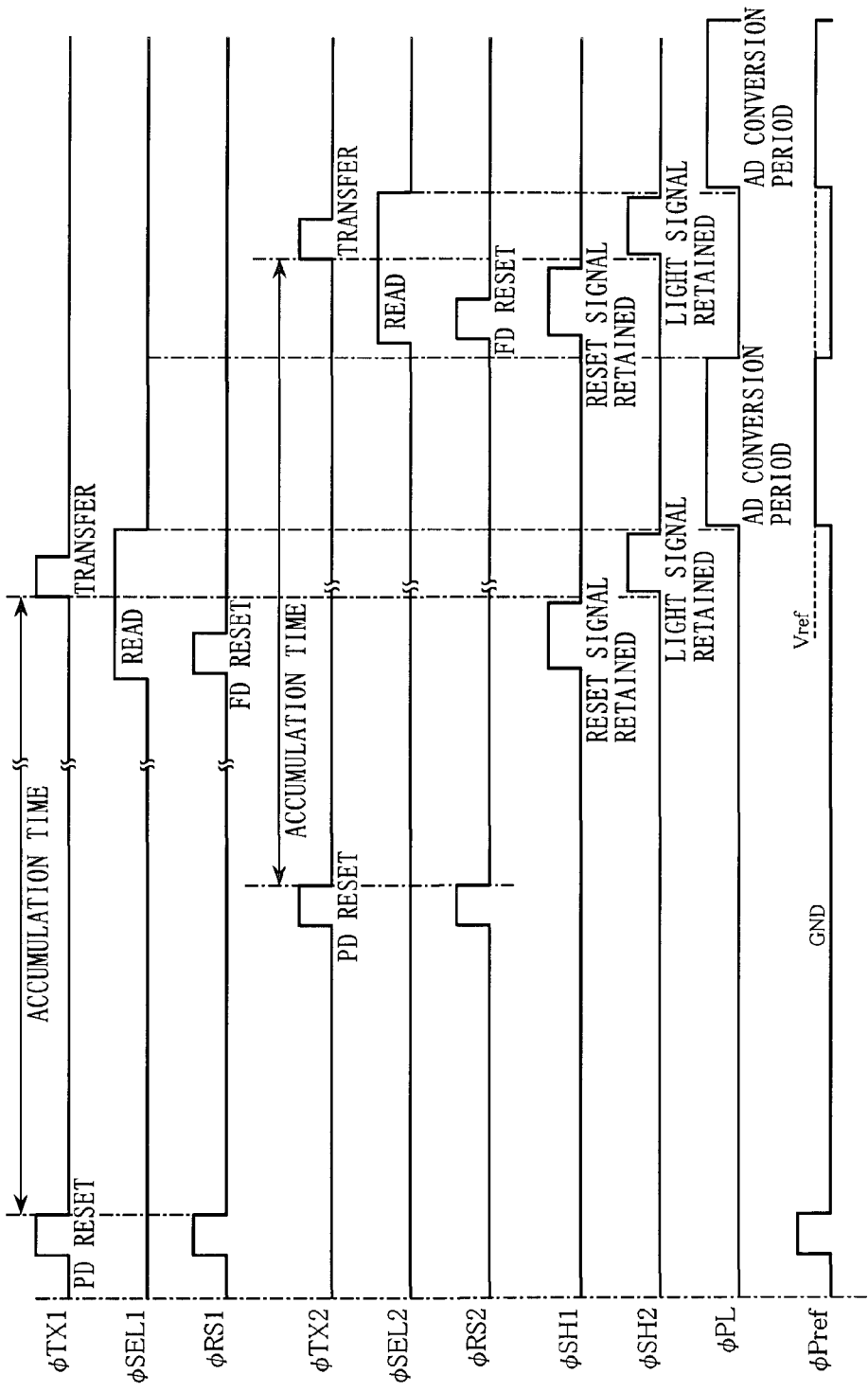
FIG. 8 is a timing chart for explaining operation of the third embodiment shown in FIG. 7.

An operation of thus constructed solid-state imaging apparatus will now be described by way of a timing chart shown in FIG. 8. The case of reading signals of the pixels of the first row will first be described. At first, the transfer control signal φTX1 and the reset control signal φRS1 are driven to high level to reset the photoelectric conversion section PD11, PD21, PD31, and the FD section C11, C21, C31 of the pixels PIX11, PIX21, PIX31 of the first row. The transfer control signal φTX1 and the reset control signal φRS1 are then brought to low level to end the resetting, thereby starting an accumulation of light signal electric charge.

Subsequently, after passage of a predetermined time, the signals of the pixels of the first row are read out to the retaining circuit 102. Previously to the reading of pixel signal, the reset control signal φRS1 is at first driven to high level to reset the FD section C11, C21, C31, and the reset control signal φRS1 is then brought to low level to end the resetting of the FD section C11, C21, C31.

The select control signal φSEL1 is then driven to high level to start an outputting of the reset signal of the pixels PIX11, PIX21, PIX31 of the first row.

Next, the first sample-and-hold control signal φSH1 of the retaining circuit 102 is driven to high level to output reset signal of the pixels PIX11, PIX21, PIX31 of the first row to the first sample-and-hold capacitors CSH11, CSH21, CSH31. The first sample-and-hold control signal φSH1 is then brought to low level to retain the reset signal at the first sample-and-hold capacitor CSH11, CSH21, CSH31. It is to be noted that the control signal φPref at this time is outputting a first reference potential (GND in the illustrated example).

Next, the transfer control signal φTX1 is driven to high level to end an accumulation of light signal electric charge and transfer the light signal electric charges to the FD section C11, C21, C31. After driving the second sample-and-hold control signal φSH2 of the retaining circuit 102 to high level, it is brought to low level to retain the light signal of the pixel PIX11, PIX21, PIX31 of the first row is retained at the second sample-and-hold capacitor CSH12, CSH22, CSH32.

Next, the control signal φPref is set to a second reference potential (Vref in the illustrated example) to add as offset voltage a voltage corresponding to a difference between the two reference potentials (GND and Vref in the illustrated example) to the reset signal retained at the first sample-and-hold capacitor CSH11, CSH21, CSH31. A signal of adding the difference between the two reference potentials to the reset signal is thereby outputted to the delay circuit 103. At this time, a signal obtained by adding a voltage corresponding to the difference between the two reference potentials to a voltage corresponding to reset signal of each pixel retained at the first sample-and-hold capacitor CSH11, CSH21, CSH31 of the retaining circuit 102 is applied on the first input terminal of the delay circuit 103 on which a power supply voltage is normally supplied. On the other hand, a voltage corresponding to light signal of each pixel retained at the second sample-and-hold capacitor CSH12, CSH22, CSH32 of the retaining circuit 102 is applied on the second input terminal of the delay circuit 103 which is normally connected to GND.

Next, the pulse signal φPL at the delay circuit 103 is driven to high level, thereby outputting from the delay circuit 103 to the encoder 104 a running position of the pulse within the delay circuit where delay devices are connected into a multiple of stages for giving a delay amount corresponding to the extent of a difference between reset signal and light signal outputted from the pixels PIX11, PIX21, PIX31 of the first row. At the encoder 104, the running position of the pulse is sampled at a predetermined timing, and such sampling value is encoded to effect a digital conversion. After passage of a predetermined time, the pulse signal φPL is brought to low level to end the digital conversion, and the latch circuit 105 retains the converted digital signal. Finally, a selection of the latch circuits 105 is effected by the column select signal a φH1 to φH3 outputted from the horizontal scanning circuit 106 so that data on the latch circuit 105 are sequentially outputted. A similar operation is then sequentially effected also on the pixels of the second row and after.

With the solid-state imaging apparatus according to the third embodiment where the above described operation is effected with the above described circuit construction, a variance in characteristic of each pixel is removed so that an excellent image can be obtained. Further, even when the reset signal and the light signal outputted from the pixel are of the same voltage, a potential difference can be given to the two signals inputted to the delay circuit 103, thereby making it possible to obtain a digital value corresponding to the extent of the difference between the two signals so as to obtain an excellent image.

It is obvious that the retaining circuit 102 in the above third embodiment can be of any construction other than the above illustrated example as far as the construction is capable of adding an offset voltage. Further, the pixel signal to which the offset voltage is added may be only the reset signal or the light signal. Furthermore, it is also possible to use a construction so that the offset voltage can be added to both the reset signal and the light signal.

Moreover, signal stabilizing capacitance Cc1, Cc2, Cc3 can be added to between the first input terminal of the delay circuit 103 and the reference voltage (GND in the illustrated example). The AD conversion accuracy can be thereby improved by suppressing a fluctuation in the input signal so that an excellent image can be obtained. Further, the above described signal stabilizing capacitance can be added to one or both of the input terminals of the delay circuit 103 or be added to between the two input terminals.

Embodiment 4

Figure 9:
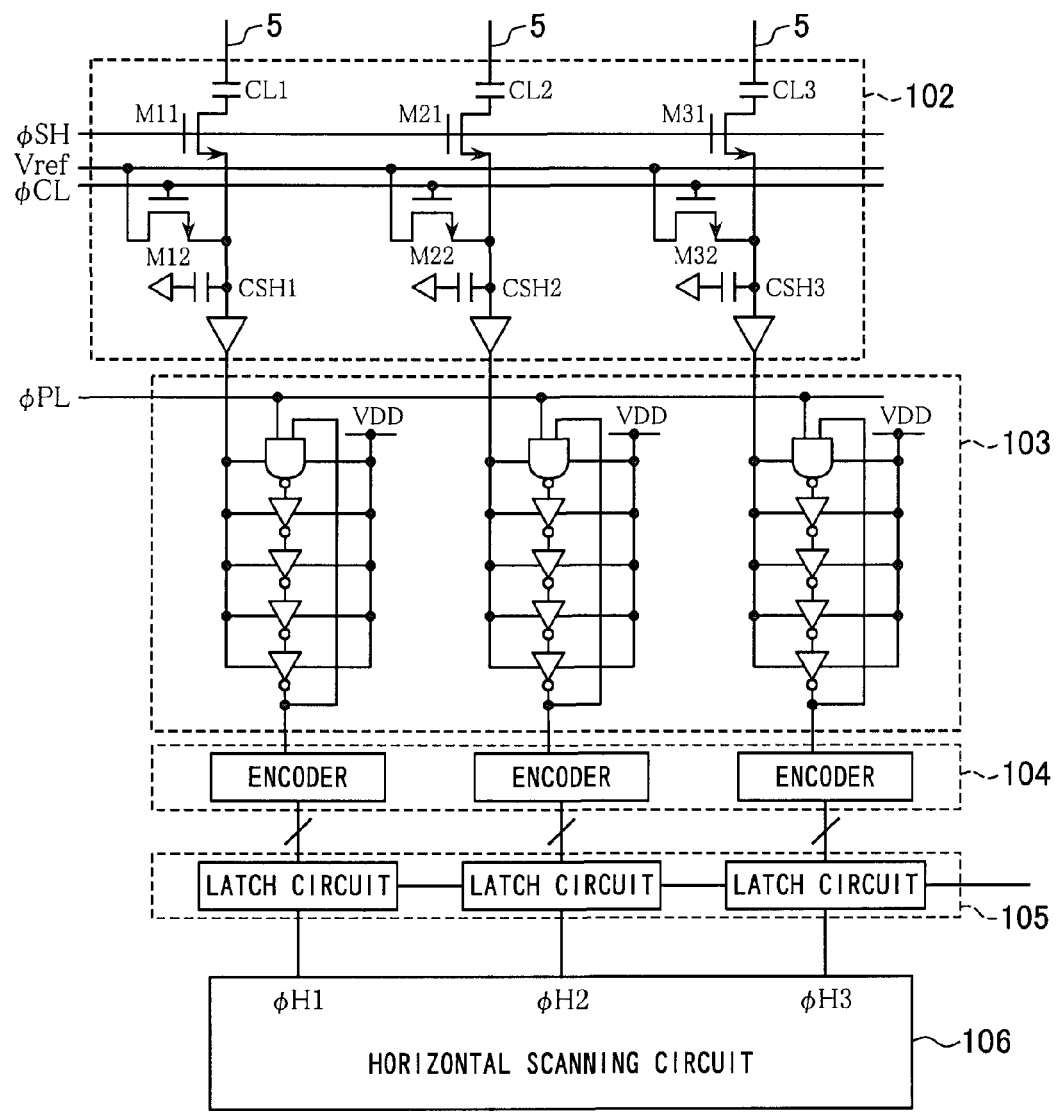
FIG. 9 is a circuit diagram showing a main portion of the solid-state imaging apparatus according to a fourth embodiment.

A fourth embodiment of the invention will now be described. FIG. 9 is a circuit diagram showing construction of a main portion of the solid-state imaging apparatus according to the fourth embodiment. When compared to the first embodiment shown in FIG. 3, it is different in the construction of the retaining circuit 102 and in the manner of connection in the delay circuit 103. In particular, the retaining circuit 102 includes clamp capacitors CL1, CL2, CL3, sample-and-hold capacitors CSH1, CSH2, CSH3, sample-and-hold switches M11, M21, M31 controlled by a sample-and-hold control signal φSH, and clamp switches M12, M22, M32 controlled by a clamp control signal φCL, which are connected as shown. In this circuit construction, a difference between reset signal and light signal, which are the two signals inputted from the pixel, is retained at the sample-and-hold capacitor CSH1, CSH2, CSH3, and then is outputted to the second output terminal of the delay circuit 103. Further, of the two input terminals of the delay circuit 103, an output signal from the retaining circuit 102 is applied on one or a second input terminal, and a reference voltage (power supply voltage VDD in the illustrated example) is applied on the other or a first input terminal. The construction of the rest is identical to the first embodiment shown in FIG. 3 and will not be described.

Figure 10:
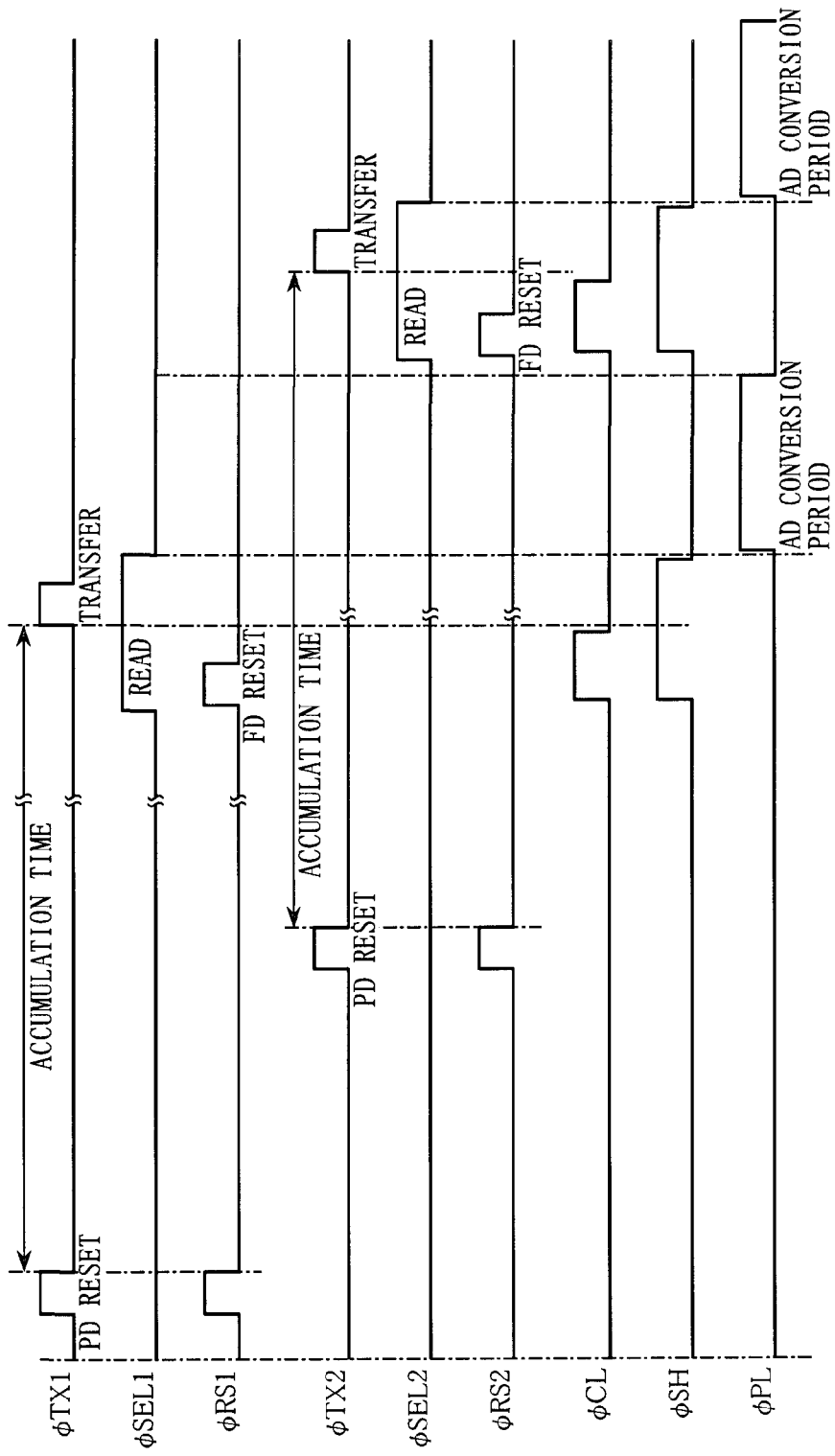
FIG. 10 is a timing chart for explaining operation of the fourth embodiment shown in FIG. 9.

An operation of thus constructed solid-state imaging apparatus will now be described by way of a timing chart shown in FIG. 10. The case of reading signals of the pixels of the first row will first be described. At first, the transfer control signal φTX1 and the reset control signal φRS1 are driven to high level to reset the photoelectric conversion section PD11, PD21, PD31, and the FD section C11, C21, C31 of the pixels of the first row. The transfer control signal φTX1 and the reset control signal φRS1 are then brought to low level to end the above resetting, thereby starting an accumulation of light signal electric charge.

Subsequently, after passage of a predetermined time, the pixel signals are read out to the retaining circuit 102. Previously to the reading of pixel signal, the reset control signal φRS1 is at first driven to high level to reset the FD section C11, C21, C31, and the reset control signal φRS1 is then brought to low level to end the resetting of the FD section C11, C21, C31. The select control signal φSEL1 is then driven to high level, thereby starting to output the reset signal of the pixels of the first row.

Next, the sample-and-hold control signal φSH and the clamp control signal φCL of the retaining circuit 102 are driven to high level to output the reset signal of the pixel PIX11, PIX21, PIX31 of the first row to the clamp capacitor CL1, CL2, CL3, and the clamp control signal φCL is brought to low level to retain the above reset signal at the clamp capacitor CL1, CL2, CL3.

Next, the transfer control signal φTX1 is driven to high level to end an accumulation of light signal electric charge, and the light signal electric charges are transferred to the FD section C11, C21, C31. By then bringing the sample-and-hold control signal φSH of the retaining circuit 102 to low level, the difference between reset signal and light signal retained at the clamp capacitor CL1, CL2, CL3 of the pixels PIX11, PIX21, PIX31 of the first row is retained at the sample-and-hold capacitor CSH1, CSH2, CSH3. At this time, of the two input terminals of the delay circuit 103, a voltage corresponding to the difference between reset signal and light signal of each pixel retained at the sample-and-hold capacitor CS1, CS2, CS3 is applied on one or a second input terminal on which GND is normally applied, and on the other hand, a reference voltage (power supply voltage VDD in the illustrated example) is applied on the other or a first input terminal.

Next, the pulse signal φPL is driven to high level so that a running position of the pulse within the delay circuit where delay devices are connected in a multiple of stages for giving a delay amount corresponding to the extent of a difference between the two input terminals of the delay circuit 103 is outputted from the delay circuit 103 to the encoder 104. At the encoder 104, the running position of the pulse is sampled at a predetermined timing, and such sampling value is encoded to effect a digital conversion. After passage of a predetermined time, the pulse signal φPL is brought to low level to end the digital conversion, and the latch circuit 105 retains the converted digital signal.

Finally, a selection of the latch circuits 105 is effected by the column select signal φH1 to φH3 outputted from the horizontal scanning circuit 106 so that data on the latch circuit 105 are sequentially outputted. A similar operation is then effected also on the pixels of the second row and after. With the solid-state imaging apparatus according to the fourth embodiment where the above described operation is effected with the above described circuit construction, a variance in characteristic of each pixel is removed similarly to the foregoing embodiments so that an excellent image can be obtained.

Embodiment 5

Figure 11:
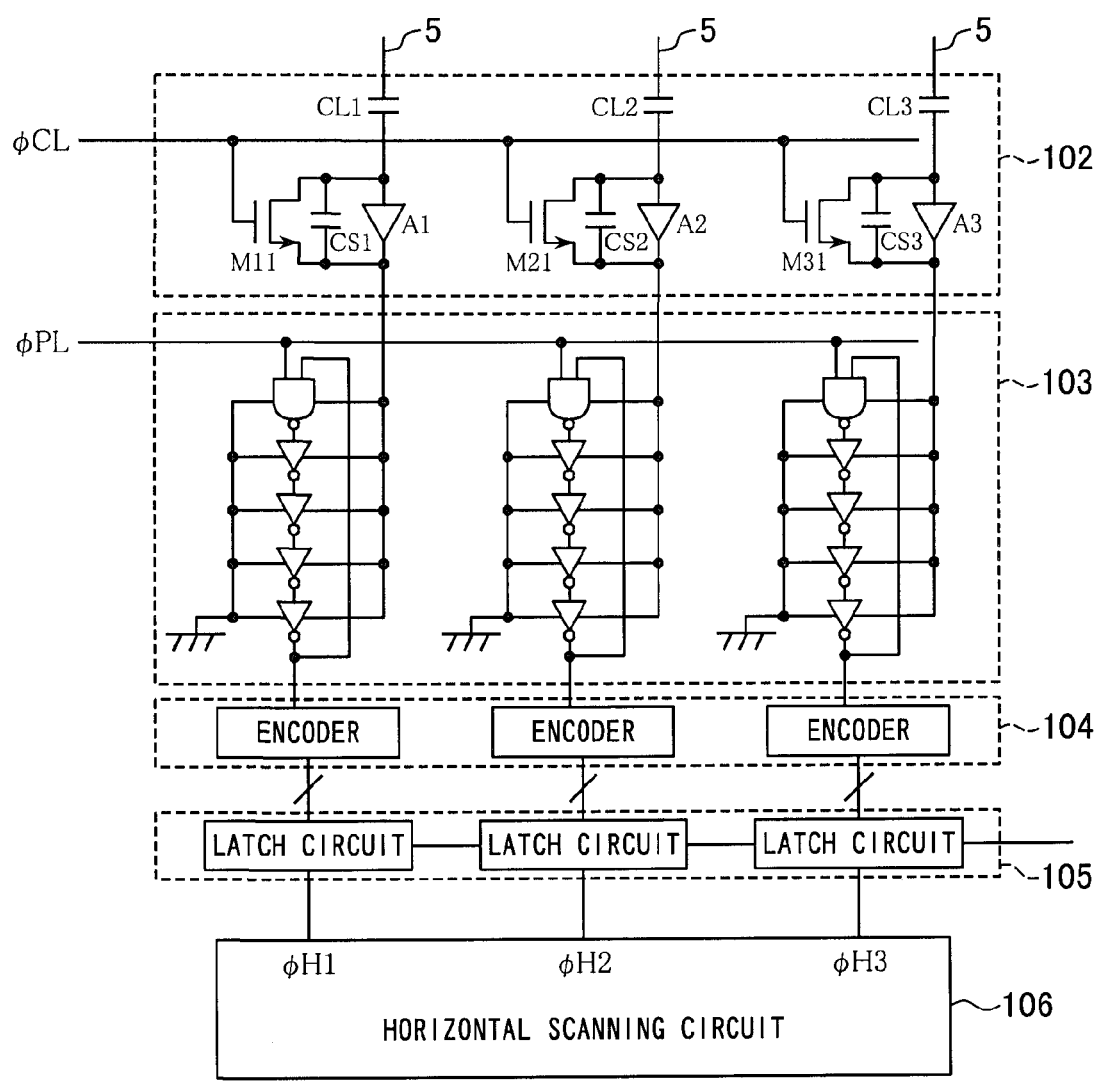
FIG. 11 is a circuit diagram showing a main portion of the solid-state imaging apparatus according to a fifth embodiment.

A fifth embodiment of the invention will now be described. FIG. 11 is a circuit diagram showing construction of a main portion of the solid-state imaging apparatus according to the fifth embodiment. When compared to the fourth embodiment shown in FIG. 9, it is different in the construction of the retaining circuit 102 and in the manner of connection in the delay circuit 103. Particularly at the retaining circuit 102, amplifiers A1, A2, A3 are added. The clamp capacitors CL1, CL2, CL3, feedback capacitors CS1, CS2, CS3, clamp switches M11, M21, M31, and the amplifiers A1, A2, A3 are then connected as shown. The retaining circuit 102 is to amplify and then output to the delay circuit 103 the difference between the two signals (reset signal and light signal) outputted from the pixel at an amplification factor determined by a ratio of the clamp capacitance to the feedback capacitance. Of the two input terminals of the delay circuit 103, an output signal from the retaining circuit 102 is inputted to one or a first input terminal, and a reference voltage (GND in the illustrated example) is connected to the other or a second input terminal. The construction of the rest is identical to the first embodiment shown in FIG. 3 and to the fourth embodiment shown in FIG. 9 and will not be described.

Figure 12:
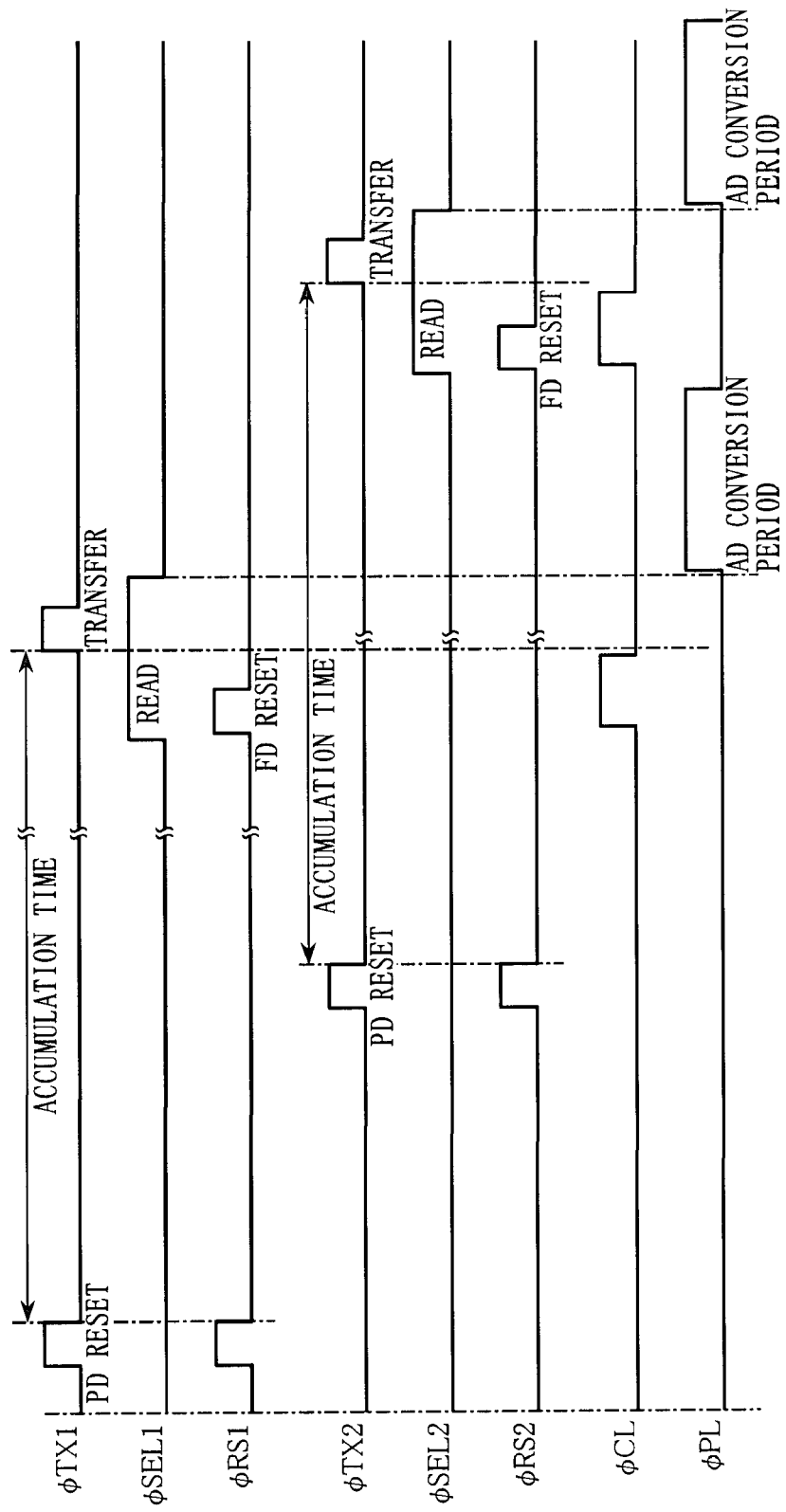
FIG. 12 is a timing chart for explaining operation of the fifth embodiment shown in FIG. 11.

An operation of thus constructed solid-state imaging apparatus will now be described by way of a timing chart shown in FIG. 12. The case of reading signals of the pixels of the first row will first be described. At first, the transfer control signal φTX1 and the reset control signal φRS1 are driven to high level to reset the photoelectric conversion section PD11, PD21, PD31, and the FD section C11, C21, C31 of the pixels of the first row. The transfer control signal φTX1 and the reset control signal φRS1 are then brought to low level to end the resetting, thereby starting an accumulation of light signal electric charge.

Subsequently, after passage of a predetermined time, the pixel signals of the first row are read out to the retaining circuit 102. Previously to the reading of pixel signal, the reset control signal φRS1 is at first driven to high level to reset the FD section C11, C21, C31, and the reset control signal φRS1 is then brought to low level to end the resetting of the FD section C11, C21, C31. The select control signal φSEL1 is then driven to high level, thereby starting to output the reset signal of the pixels of the first row.

Next, the clamp control signal φCL of the retaining circuit 102 is driven to high level to output reset signal of the pixel PIX11, PIX21, PIX31 of the first row to the clamp capacitor CL1, CL2, CL3. The clamp control signal φCL is then brought to low level to retain the reset signal at the clamp capacitor CL1, CL2, CL3.

Next, the transfer control signal φTX1 is driven to high level to end an accumulation of light signal electric charge, and the light signal electric charges are transferred to the FD section C11, C21, C31. The light signal electric charges retained at the FD section C11, C21, C31 is thereby outputted as light signal to the retaining circuit 102 through the amplification section MA11, MA21, MA31, the select switch MS11, MS21, MS31, and the vertical signal line 5. At this time, the difference between the reset signal retained at the clamp capacitor CL1, CL2, CL3 and the light signal outputted from the pixel PIX11, PIX21, PIX31 of the first row is amplified at the retaining circuit 102 by an amplification factor determined by a ratio of the clamp capacitance CL1, CL2, CL3 to the feedback capacitance CS1, CS2, CS3. It should be noted that, of the two input terminals of the delay circuit 103, an output signal from the retaining circuit 102 is applied on a first input terminal on which a power supply voltage is normally applied, and a reference voltage (GND in the illustrated example) is applied on the other or a second input terminal.

Next, the pulse signal φPL is driven to high level at the delay circuit 103 so that a running position of the pulse within the delay circuit where delay devices are connected into a multiple of stages for giving a delay amount corresponding to the extent of a difference between the voltages applied on the two input terminals of the delay circuit 103 is outputted from the delay circuit 103 to the encoder 104. Therefore, the running position of the pulse within the delay circuit where delay devices are connected into a multiple of stages for giving a delay amount corresponding to a signal obtained as amplifying the difference between two signals (reset signal and light signal) outputted from the pixel is outputted from the delay circuit 103 to the encoder 104. At the encoder 104, the running position of the pulse is sampled at a predetermined timing, and such sampling value is encoded to effect a digital conversion. After passage of a predetermined time, the pulse signal φPL is brought to low level to end the digital conversion, and the latch circuit 105 then retains the converted digital signal.

Finally, a selection of the latch circuits 105 is effected by the column select signal φH1 to φH3 outputted from the horizontal scanning circuit 106 so that data on the latch circuit 105 are sequentially outputted. A similar operation is then sequentially effected also on the pixels of the second row and after. With the solid-state imaging apparatus according to the fifth embodiment where the above described operation is effected with the above described circuit construction, a variance in characteristic of each pixel is removed similarly to the foregoing embodiments so that an excellent image can be obtained.

While the present invention has been described by way of some embodiments, the invention is not limited to the above embodiments and may be implemented in various modes without departing from the spirit of the invention. For example, while the pixel in the above embodiments has been shown as one consisting of a photoelectric conversion section, a transfer switch, a reset switch, an amplification section, and a select switch, the pixel construction may also be one consisting of a photoelectric conversion section, a reset switch, an amplification section, and a select switch. In other words, the pixel construction includes but is not limited to the one in the above embodiments, and any pixel construction from which two signals, i.e. reset signal and light signal are outputted suffices. Further, while the retaining circuit in the above embodiments is formed of capacitor and switch, it is obvious that any circuit construction may be used in a similar manner as far as the circuit construction is capable of retaining the signal to be retained and outputting it to the delay circuit.

Figure 13:
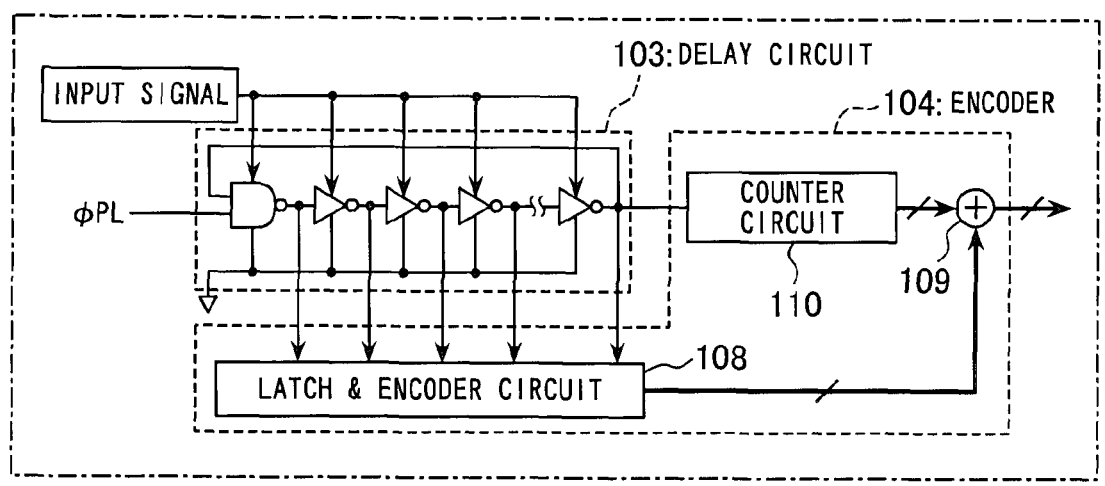
FIG. 13 is a block diagram showing a modification of the AD conversion section in each embodiment.

Further, it is also possible to form an AD conversion section where an encoder 104 having a latch and encoder circuit 108 and a counter circuit 110 is provided as shown in FIG. 13 at the delay circuit 103 shown in the above embodiments (Embodiment 1 to 5). In particular, the latch and encoder circuit 108 detects a number of stages of the delay circuit 103 through which a pulse generated at the delay circuit 103 passes, and converts the value at such number of stages into a digital value. What is obtained by adding such a digital output value to an output value of the counter circuit 110 at an adder 109 is outputted as an output of the AD conversion section. With such construction, it is possible to further improve a resolution at the AD conversion section. In any case, the delay circuit 103 may be used similarly to the above embodiments, as far as it has a function for converting into a digital value the running position of pulse within a delay circuit, where delay devices are connected into a multiple of stages for giving a delay amount corresponding to input signal.

According to the first aspect of the invention, a noise due to a variance in characteristic of each pixel; can be removed by differentiating reset signal and light signal outputted from the pixel so that a solid-state imaging apparatus can be achieved as capable of obtaining an excellent image. According to the second aspect, the variance in characteristic of each pixel is removed by differentiating reset signal and light signal outputted from the pixel so that an excellent image can be obtained. Further, it becomes possible to perform AD conversion even after an outputting of light signal by pixel is ended so that a performance in AD conversion can be improved to obtain a more excellent image. According to the third aspect, the noise due to the variance in characteristic of each pixel can be removed by differentiating reset signal and light signal outputted from the pixel so that an excellent image can be obtained. Further, it is possible to give a potential difference to two signals inputted to a delay circuit even when reset signal and light signal, outputted from the pixel are of the same voltage, whereby a digital value corresponding to the extent of difference between the two signals can be obtained so that an image can be obtained. According to the fourth and fifth aspects, the noise due to the variance in characteristic of each pixel can be removed by differentiating reset signal and light signal outputted from the pixel so that an excellent image can be obtained.

What is claimed is:

1. A solid-state imaging apparatus comprising:
a pixel section where a plurality of pixels each containing a photoelectric conversion device are formed into an array;
a retaining circuit for retaining one or the other of a reset signal and a light signal of the signals from said pixel; and
an AD converter, said AD converter comprising:
a delay circuit having two input signal terminals to one of the input signal terminals of which said signal retained at said retaining circuit is inputted and to the other one of the input signal terminal of which the other signal not retained at said retaining circuit is inputted, said delay circuit having delay devices connected into a multiple of stages for giving to a running pulse a delay amount corresponding to the extent of a difference between the signals inputted to said one and the other input signal terminals; and an encoder for sampling and encoding a running position of said pulse at every predetermined timing to generate a digital value corresponding to the difference between said input signals.

2. The solid-state imaging apparatus according to claim 1 taking said retaining circuit as a first retaining circuit and further comprising a second retaining circuit for retaining the other signal not retained at the first retaining circuit, wherein the signal retained at said second retaining circuit is inputted to said the other input signal terminal of said AD converter.

3. The solid-state imaging apparatus according to claim 1 further comprising a circuit for superimposing an offset value so that the signals respectively inputted to the two input signal terminals of said AD converter are not the same with each other.

4. A solid-state imaging apparatus comprising:

a pixel section where a plurality of pixels each having a photoelectric conversion device are formed into an array;

a differential processing circuit for computing a difference between a reset signal and a light signal from said pixel; and an AD converter, said AD converter comprising:

a delay circuit having two input signal terminals to one of the input signal terminals of which an output from said differential processing circuit is inputted and to the other one of the input signal terminals of which a reference signal is inputted, said delay circuit having delay devices connected in a multiple of stages for giving to a running pulse a delay amount corresponding to the extent of a difference between the signals inputted to said one and the other input signal terminals; and an encoder for sampling and encoding a running position of said pulse at every predetermined timing to generate a digital value corresponding to the difference between said input signals.

5. The solid-state imaging apparatus according to claim 4 further comprising an amplification circuit for applying a predetermined gain on the output from said differential processing circuit and then outputting from said amplification circuit to the one input signal terminal of said AD converter.

* * * * *